UNITED STATES PATENT OFFICE 2,049,510

AZO-ANTHRANILIC ACID AND ITS PRODUCTION

Mordecai Mendoza and Francis Leslie Rose, Blackley, Manchester, England, assignors to Imperial Chemical Industries Limited, a corporation of Great Britain No Drawing. Application May 29, 1934, Serial No. 728,190. In Great Britain June 7, 1933

8 Claims. (Cl. 260—96)

The present invention relates to the manufacture of a new dyestuff intermediate, namely, azo-anthranilic acid.

According to the invention we manufacture the hitherto unknown azo-anthranilic acid by the process which comprises coupling a diazotized amine, the amine being of the general formula

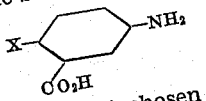

where X is a substituent chosen from the group which consists of nitro and acylamino substituents, with an aldehyde-bisulphite compound of anthranilic acid, and then converting the substituent X to the amino substituent and removing the aldehyde-bisulphite by hydrolysis.

Thus, for example 5-aminoacetylanthranilic acid is diazotized and coupled with the formaldehyde-bisulphite compound of anthranilic acid, and the product is subjected to hydrolysis, or 3-amino-6-nitrobenzoic acid is coupled with the formaldehyde-bisulphite compound of anthranilic acid and the product is then hydrolized by e. g. by means of caustic soda and subsequently reduced means of sodium sulphide.

The new dyestuff intermediate is useful for the production of azo dyestuffs, and particularly for the production of metalliferous azo dyestuffs.

The invention is illustrated but not limited by the following examples, in which parts are by weight.

Example 1—Production from 5-amino-acetyl-anthranilic acid 19.4 parts of 5-aminoacetylanthranilic acid obtained for example, by the reduction of 5-nitroacetylanthranilic acid which can be obtained either by the nitration of acetylanthranilic acid (cf. Rupe, Ber., 30, 1097) or by the oxidation of 5-nitroacetyl-o-toluidine are dissolved in 150 parts of water with the aid of 9.2 parts of hydrochloric acid and the solution is cooled to 5° C. Diazotization is effected by adding 69 parts of a 10% aqueous solution of sodium nitrite. When diazotization is complete, sufficient sodium acetate is added to the diazo suspension to remove mineral acidity and the diazo compound is then added with stirring to a solution of 25.3 parts of the monosodium salt of ω-suphomethylanthranilic acid (D. R. P. 156,760) in 150 parts of water with the aid of 5.3 parts of calcined sodium carbonate. Coupling is slow and is allowed to proceed for about 24 hours sufficient sodium bicarbonate being added from time to time to remove the acid reaction. A deep yellow brown solution is obtained. 84 parts of 25% hydrochloric acid are then added to impart a definite acid reaction to Congo paper and the mixture is boiled until no more sulphur dioxide is evolved. 120 parts of caustic soda lye (34%) are then cautiously added and boiling is maintained for a further 3-4 hours. At the end of this period the acetyl grouping is removed, the solution is cooled to 15° C. by the addition of ice and the azo-anthranilic acid is finally precipitated by adding hydrochloric acid. When dried and ground it is a dark greenish powder. It is very sparingly soluble in cold dilute mineral acids, moderately soluble in more concentrated acids especially on warming giving red solutions. It readily dissolves in cold alkalies with the production of greenish-yellow solutions. It decomposes at about 210° C.

Example 2—Production from 3-amino-6-nitro-benzoic acid 18.2 parts of 3-amino-6-nitrobenzoic acid (G. P. 104,495) are suspended in 150 parts of water containing 9.2 parts of hydrochloric acid and the suspension is cooled to 5° C. Diazotization is effected by adding 6.9 parts of sodium nitrite and the diazo solution is then added with stirring to a solution of 25.3 parts of the monosodium salt of ω-sulphomethylanthranilic acid in 150 parts of water containing 5.3 parts of sodium hydrous sodium carbonate and 25 parts of sodium acetate crystals. Coupling is rapid and result in the formation of brownish-red solution. When coupling is complete, 125 parts of caustic soda lye (34%) are added and the mixture is boiled under gentle reflux for 2 hours to split off the ω-sulphomethyl grouping. The resulting solution is then cooled to 50° C., 36 parts of sodium sulphide dissolved in 100 parts of water are added and the temperature is raised to 70° C. and maintained until the reduction of the nitro compound is complete. The reduction liquor then cooled to 15° C., sufficient hydrochloric acid is added to impart a definite reaction to Congo red paper and the azo-anthranilic acid, which deposited as a dark green flocculent mass, is filtered off, dried and ground.

We claim:
1. Azo-anthranilic acid.
2. A compound having the formula:

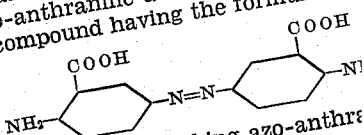

3. The method of making azo-anthra which comprises coupling diazotized 5-amino-acetylanthranilic acid with the monosodium salt of omegasulfoanthranilic acid in sodium carbonate solution, acidifying and boiling until the evolution of sulfur dioxide ceases, making basic, and boiling for about two hours, and separating out the product.

4. The method of making azo-anthranilic acid which comprises coupling 3-amino-6-nitrobenzoic acid with omegasulfoanthranilic acid, splitting off the sulfomethyl grouping by boiling under reflux for about two hours, reducing the nitromonoazo compound, and precipitating the product.

5. The method of making azo-anthranilic acid which comprises coupling diazotized 5-amino-acetylanthranilic acid with an aldehyde-bisulfite compound of anthranilic acid, and removing the aldehyde-bisulfite.

6. The method of making azo-anthranilic acid which comprises coupling diazotized 3-amino-6-nitrobenzoic acid with an aldehyde-bisulfite compound of anthranilic acid, splitting off the aldehyde-bisulfite and reducing the nitro group.

7. The process of making azo-anthranilic acid which comprises coup... the general formula:

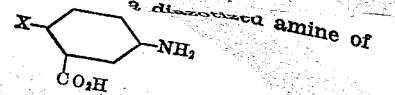

a diazotized amine of in which X is one of a group of substituents consisting of nitro- or acylamino with an aldehyde bisulfite compound of anthranilic acid, converting the substituent X to the amino substituent and removing the aldehyde bisulfite by hydrolysis.

8. The process of making azo-anthranilic acid which comprises coupling a diazotized amine of the general formula:

in which X is one of a group of substituents consisting of nitro- or acylamino with an aldehyde bisulfite compound of anthranilic acid, converting the substituent X to the amino substituent, and removing the aldehyde bisulfite.

MORDECAI MENDOZA.
FRANCIS LESLIE ROSE.